L. DAVIDSON.
ANTISKIDDING DEVICE FOR AUTOMOBILE WHEELS.
APPLICATION FILED OCT. 28, 1913.
1,123,702.
Patented Jan. 5, 1915.
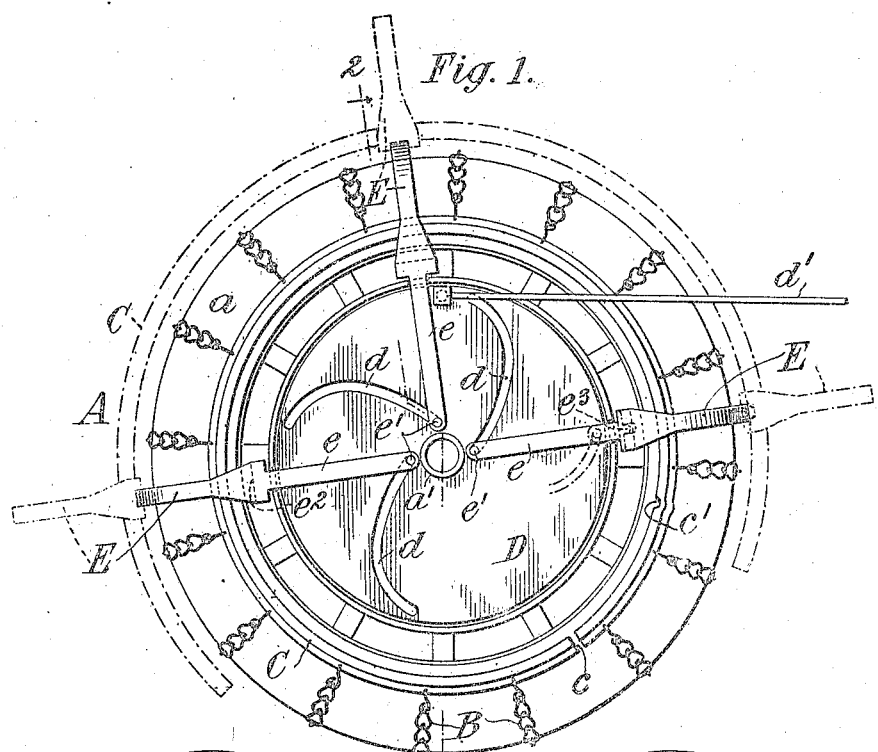
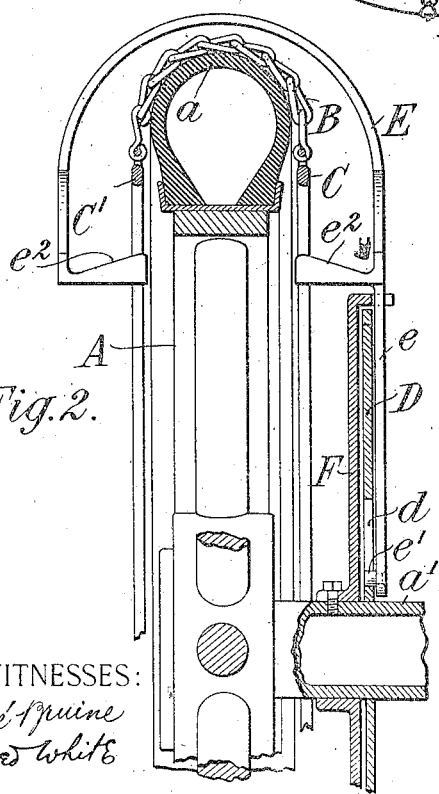
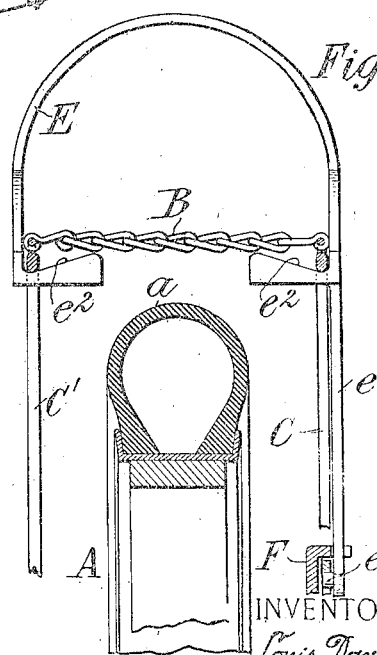
WITNESSES:
René Pruine
Fred White
INVENTOR
Louis Davidson,
By Attorneys
Fraser, Turk & Myers

UNITED STATES PATENT OFFICE.

LOUIS DAVIDSON, OF NEW YORK, N. Y.

ANTISKIDDING DEVICE FOR AUTOMOBILE-WHEELS.

1,123,702.

Specification of Letters Patent.

Patented Jan. 5, 1915.

Application filed October 28, 1913. Serial No. 797,816.

*To all whom it may concern:*

Be it known that I, LOUIS DAVIDSON, a citizen of the United States, residing in the borough of Manhattan, city, county, and State of New York, have invented certain new and useful Improvements in Antiskidding Devices for Automobile-Wheels, of which the following is a specification.

My invention relates to devices for preventing skidding of automobile wheels, and has for its object to provide the usual frictional device which is employed to prevent skidding, with means whereby the same may be withdrawn from operative position when not required and maintained in inoperative position, or may be applied to operative position when desired while the car is in use, and preferably by devices which are under the control of the chauffeur.

One embodiment of my invention is illustrated in the accompanying drawings, wherein,—

Figure 1 illustrates an elevation of an automobile wheel having my invention applied thereto; Fig. 2 is an enlarged detail view thereof, parts being broken away, and the friction devices being shown in operative position; and Fig. 3 is a view similar to Fig. 2, the friction devices being withdrawn from operative position.

In accordance with my invention the automobile wheel A has the usual pneumatic tire $a$, which is conventionally illustrated. Frictional devices are employed to prevent skidding of the wheel, and these may if desired consist of the usual chains B.

According to my invention means are provided whereby the frictional devices, such as the chains B, may be withdrawn from operative position when their use is not required, and particularly whereby the same may when they are needed be promptly applied in operative position without stopping the car or interfering with its use, and whereby such application may if desired be made by the chauffeur or driver of the car without leaving his seat.

The particular method of carrying my invention into effect which is illustrated in the accompanying drawings, and which is the best method now known to me of accomplishing this purpose, employs a carrier for the chains which is in the form of a ring. Of these rings, two are employed lettered C C', and the respective ends of the chains are attached thereto. These rings are split at $c$, and are spring rings, to wit, their normal tendency is to draw the chains toward the hub of the wheel. The split in the ring is provided for the purpose of enabling the ring to be expanded whereby the chains B are drawn away from the wheel and out of operative position, and thereby the chains are removed from underneath the wheel so that the wheel may freely revolve clear of the said chains, and the split rings then occupying a circle of greater diameter than the wheel, would have a tendency to hit the ground but for the fact that the expansion thereof has separated the ends of the rings and removed the same from contact with the ground. The rings C C' are illustrated in full lines in their inward position in Fig. 1, in which position the chains B as illustrated are in operative relation to the tire. The outward or expanded position of the rings is indicated in dotted lines in Fig. 1, and in this position, as seen in cross-section Fig. 3, the chains B are out of contact with the wheel, so that the wheel may revolve free thereof. The split rings C C' possess many advantages for the purpose for which they are employed, but other means may be found available to use for carrying the friction devices, and indeed such devices while usually consisting of chains B, are not necessarily restricted in use to the employment of such chains.

One means whereby the application of the friction devices is controlled, is illustrated, and takes the form of a rotary cam-disk D having cam slots $d$. Such rotary disk is mounted upon the axle $a^1$, and is turned by a controlling rod $d^1$ which is illustrated as pivoted thereto, and which extends to a point where it may be within reach of the chauffeur. I have not illustrated the handle by which the chauffeur may control the longitudinal movement of this rod, as I have not deemed it necessary, inasmuch as the said construction is well known and may consist of an ordinary speed controlling lever as used upon automobiles to which the end of the rod $d^1$ may be pivoted. A suspender E is provided which is in the form of a bail and has an extension $e$ which when the suspender E is in its innermost position passes adjacent to the hub $a^1$. On its inner end said extension has a stud $e^1$ which is within the slot $d$. Rotation of the disk D causes the stud $e^1$ to ride to the outer end of said slot, thereby elevating the suspender E. In its outward movement said suspender engages the split rings C C' by its ledges $e^2$ and carries the same out with it to a point where the chain B is free of contact with the tire as illustrated in Fig. 3. At this point the split rings will ride down the beveled outer face of said ledges, as indicated in Fig. 3, whereby the chain B will be drawn taut and rattling will be prevented. When it is desired to apply the chains, a movement of the handle controlling the rod $d^1$ will rotate the disk D, causing the studs $e^1$ to ride down to the inner end of the slots $d$, and carrying the suspender E entirely out of contact with the split rings C C' as indicated in Fig. 2. Here it will be seen that the supports C C' owing to their tendency to draw toward the middle of the wheel, have drawn the chains B tightly around the periphery of the tire, the suspenders E having passed entirely out of contact with the supports, and the latter are free to revolve with the wheel, permitting the chains B to creep thereon.

Preferably devices will be provided for the purpose of locating the split rings C C' in position with relation to the suspender devices, so that the split $c$ will come into proper position, and such devices may well take the form of a recess $c^1$ upon the spring ring, which is adapted to receive a similar lug $e^3$ upon the inside of the suspender E.

A cover or dust shield F may be conveniently provided for the purpose of protecting the cam disk D and associated parts from dust, etc. This is not seen in Fig. 2, which is a view taken from the right hand side of Fig. 1.

It is frequently desired to apply anti-skidding devices to an automobile wheel hurriedly, due to the presence of dry sand, or a wet or greasy road, or of any causes which produce skidding of the car. According to my invention such friction devices whether consisting of chains or otherwise, may be quickly applied without difficulty or special preparation by simply rotating the disk D by means of the control rod or chain $d^1$, which may be actuated by the chauffeur from his seat. This permits the spring rings C C' to contract and draw inwardly, carrying with them the chains B and applying the same in position at once. In view of the fact that immediately upon the application of the said chains they begin turning with the wheel, carrying the split rings with them, the said rings will very quickly pass to their innermost position, and will accomplish the purpose for which such devices are designed. The withdrawal of the frictional devices such as the chains B from operative position, is usually not desired to be done hurriedly, and indeed may well wait until the car can be jacked up so as to take the weight from the tires. Should however it be desired to remove the said frictional devices to inoperative position, pressure upon the rod $d^1$ will cause the rings to pass to outward position, carrying the chains to the position illustrated in Fig. 3.

The details employed by me in applying my invention in actual practice may be varied within the limits of the appended claims, and I do not concede that my invention is limited to the particular mechanical details employed. For instance the particular variety of friction devices is not essential, nor is it essential that the particular suspending devices or supports illustrated should be employed; nor that the rotary disk should be used as the means for moving the chains to inoperative position. These mechanical appliances and others may be changed and equivalent devices used therefor, without departing from the invention as the same is claimed in the accompanying claims.

What I claim is:—

1. An anti-skidding device for automobiles comprising a series of frictional devices arranged at intervals around the tire of an automobile wheel but disconnected from said wheel, means for simultaneously moving said devices either out of or to operative position relative to said tire.

2. An anti-skidding device for automobiles comprising a series of frictional devices arranged at intervals around the tire of an automobile wheel but disconnected from said wheel, means for simultaneously moving said devices either out of or to operative position relative to said tire, and a connection extending therefrom to a point convenient to the chauffeur for controlling the same.

3. An anti-skidding device for automobiles comprising a series of chains arranged at intervals crosswise of the tread of the automobile wheel but disconnected from said wheel, and a support for said chains movable toward and from the axis of the wheel and adapted when moved to move all said chains into or out of operative position with relation to the wheel.

4. An anti-skidding device for automobiles comprising a series of chains arranged at intervals crosswise of the tread of the automobile wheel but disconnected from said wheel, movable supports for the said chains adapted to move all said chains simultaneously into or out of operative position, and means for adjusting said supports radially with respect to said wheels, whereby said chains are simultaneously moved into or out of operative position with respect to the wheels according to said adjustment.

5. An anti-skidding device for automobiles comprising a series of frictional devices arranged peripherally of a wheel of an automobile but disconnected from said wheel, movable supports therefor adapted to move a plurality of said devices simultaneously into or out of operative position, and means for adjusting said supports whereby said devices are moved into or out of operative position with respect to the said wheel according to said adjustment.

6. An anti-skidding device for automobiles comprising a series of chains arranged peripherally of a wheel of an automobile but disconnected from said wheel, movable spring carriers for said chains, adapted to move the same into or out of operative position relative to said wheel, and means for adjusting said carriers.

7. An anti-skidding device for automobiles comprising a series of chains arranged peripherally of a wheel of an automobile, movable annular spring carriers for said chains, normally drawing said chains toward said wheel and adapted according to movement to move all said chains into or out of operative position, means for moving said springs away from the axis of said wheel whereby said chains are moved out of contact with said wheel, said means adapted according to adjustment to permit said chains to engage said wheel.

8. An anti-skidding device for automobiles comprising a series of friction devices arranged peripherally of a wheel of an automobile but disconnected therefrom, supports for said devices movable radially, which are adapted when moved to move said devices into or out of operative position with respect to said wheel, said friction devices being free from said supports when in operative position whereby when said devices are in said operative position they are free to turn with said wheel.

9. An anti-skidding device for automobiles comprising a series of connected chains arranged peripherally of a wheel of an automobile, movable supports for said chains adapted when moved to simultaneously adjust all said chains to and from operative position with respect to the wheel, and said chains being disconnected from said supports whereby when said chains are in operative position they are free to turn with said wheel.

10. An anti-skidding device for automobiles comprising a series of chains arranged peripherally of a wheel of said automobile, a split spring ring secured to said chains and normally tending to draw said chains into operative position with relation to said wheel, and means for expanding said ring and holding the same in expanded position whereby said chains are removed from operative position.

11. Tire chains for automobile wheels, split spring rings to which the ends of said chains are attached, suspenders for said rings, and means for moving said suspenders radially, and controlling means therefor extending outside of the wheel, said suspenders adapted to hold said rings maintained in expanded position, and said rings free to turn when in their inner position.

12. Tire chains for automobile wheels, split spring rings to which the ends of said chains are attached, suspenders for said rings, a rotary disk having cam slots, studs on said suspenders entering said slots, and means for rotating said disk.

13. An anti-skidding device for automobile tires comprising a series of friction devices arranged transversely of the tread of a wheel but disconnected from said wheel, and means for moving said friction devices simultaneously into and out of operative position.

14. Anti-skidding devices for automobiles comprising a plurality of tire chains arranged transversely of the tread of a wheel but disconnected from said wheel, spring carriers for said chains normally tending to draw said chains to operative position, and means for simultaneously moving all said chains into or out of operative position, said chains being free from said moving means when in operative position whereby they may turn with said wheel.

15. An anti-skidding device for automobiles comprising a series of tire chains arranged peripherally of a wheel of an automobile, supports for said chains adapted to move the same radially with respect to the wheel whereby they are brought into inoperative position or removed therefrom, controlling devices for adjusting the position of said supports, and means in said supports whereby the chains are extended when in inoperative position.

16. An anti-skidding device for automobiles comprising a series of chains arranged peripherally of a wheel of an automobile, split spring rings secured to said chains and normally tending to draw said chains to operative position with relation to said wheel, a series of suspenders adapted to move said rings so as to withdraw said chains from operative position and beveled faces in said suspenders with which said rings contact when the suspenders are moved away from the wheel whereby said rings are caused to ride down said beveled faces and draw the chains taut.

17. An anti-skidding device for automobiles comprising a series of friction devices arranged peripherally of a wheel of an automobile, split spring rings for supporting said friction devices, said rings being free to revolve with said wheel when the chains are in operative position, devices for expanding said rings and controlling means therefor and centering devices located between said rings and said expanding devices whereby the rings are caused to be expanded with the split thereof in desired position.

18. Tire chains for automobile wheels, split spring rings to which the ends of said chains are attached, suspenders for said rings, lugs on said suspenders adapted to register with recesses in said rings to cause the said rings to be expanded as desired, and means for moving said suspenders radially.

19. Anti-skidding devices for automobile wheels comprising a series of connected friction devices extending crosswise of the tire but disconnected therefrom, movable supports for said friction devices which are adapted when moved to move said friction devices into or out of operative position and said supports adapted when said friction devices are in operative position to release same and permit them to turn with the wheel, and said friction devices being adapted when moved by said supports out of operative position to be free of the said wheel.

20. Anti-skidding devices for automobile wheels comprising a series of connected friction devices disconnected from a wheel, means for simultaneously moving all said devices toward or from the wheel and into or out of operative position, said devices being disconnected from said moving means so that they are free to turn with said wheel when in operative position and means under the control of the chauffeur for operating such moving means.

21. Anti-skidding devices for automobile wheels comprising a series of connected tire chains, disconnected from a wheel, movable supports therefor by which said chains may all be simultaneously and freely moved into or out of operative position as said supports are moved, said chains being detached from said supports, whereby they are free to turn with the wheel when in operative position, and a lever convenient to the chauffeur controlling the movement of said supports, whereby the chauffeur may apply said anti-skidding devices or release same as required without leaving his seat.

In witness whereof, I have hereunto signed my name in the presence of two subscribing witnesses.

LOUIS DAVIDSON.

Witnesses:
  HENRY M. TURK.
  FRED WHITE.